United States Patent [19]

Betz

[11] 4,102,208
[45] Jul. 25, 1978

[54] SOUND LEVEL METER

[75] Inventor: Tilman Betz, Groebenzell, Germany

[73] Assignee: Rhode and Schwarz, Germany

[21] Appl. No.: 785,014

[22] Filed: Apr. 6, 1977

[30] Foreign Application Priority Data

Apr. 14, 1976 [DE] Fed. Rep. of Germany ....... 2616585

[51] Int. Cl.$^2$ .............................................. G01H 3/12
[52] U.S. Cl. ...................................................... 73/647
[58] Field of Search ................. 73/556, 557, 558, 646, 73/647, 648; 179/1 N; 340/261

[56] References Cited

U.S. PATENT DOCUMENTS

| 2,590,460 | 3/1952 | Rackey et al. ............................ 73/557 |
| 3,802,535 | 4/1974 | Peake et al. ........................ 73/557 X |
| 3,977,257 | 8/1976 | Steger ..................................... 73/558 |

FOREIGN PATENT DOCUMENTS 1,349,408  4/1974  United Kingdom .................. 73/557

Primary Examiner—Richard C. Queisser
Assistant Examiner—John P. Beauchamp
Attorney, Agent, or Firm—Hill, Gross, Simpson, Van Santen, Steadman, Chiara & Simpson

[57] ABSTRACT

In a sound level meter the output voltage of the microphone is fed to a voltage-frequency converter by way of an exponentially operating circuit, such as a squarer, and the output of the converter operates a binary counter having an indicator unit associated therewith. A gate circuit is controlled by a timing generator and is interposed between the voltage-frequency converter and the binary counter. The indicator unit includes a plurality of indicating elements which are connected at the outputs of the successive counter stages and each of the indicator elements is associated with a particular indicia carried on a dB scale. With a squarer as the exponential circuit the dB scale has a 3 dB incrementation for the respective indicator elements.

19 Claims, 3 Drawing Figures

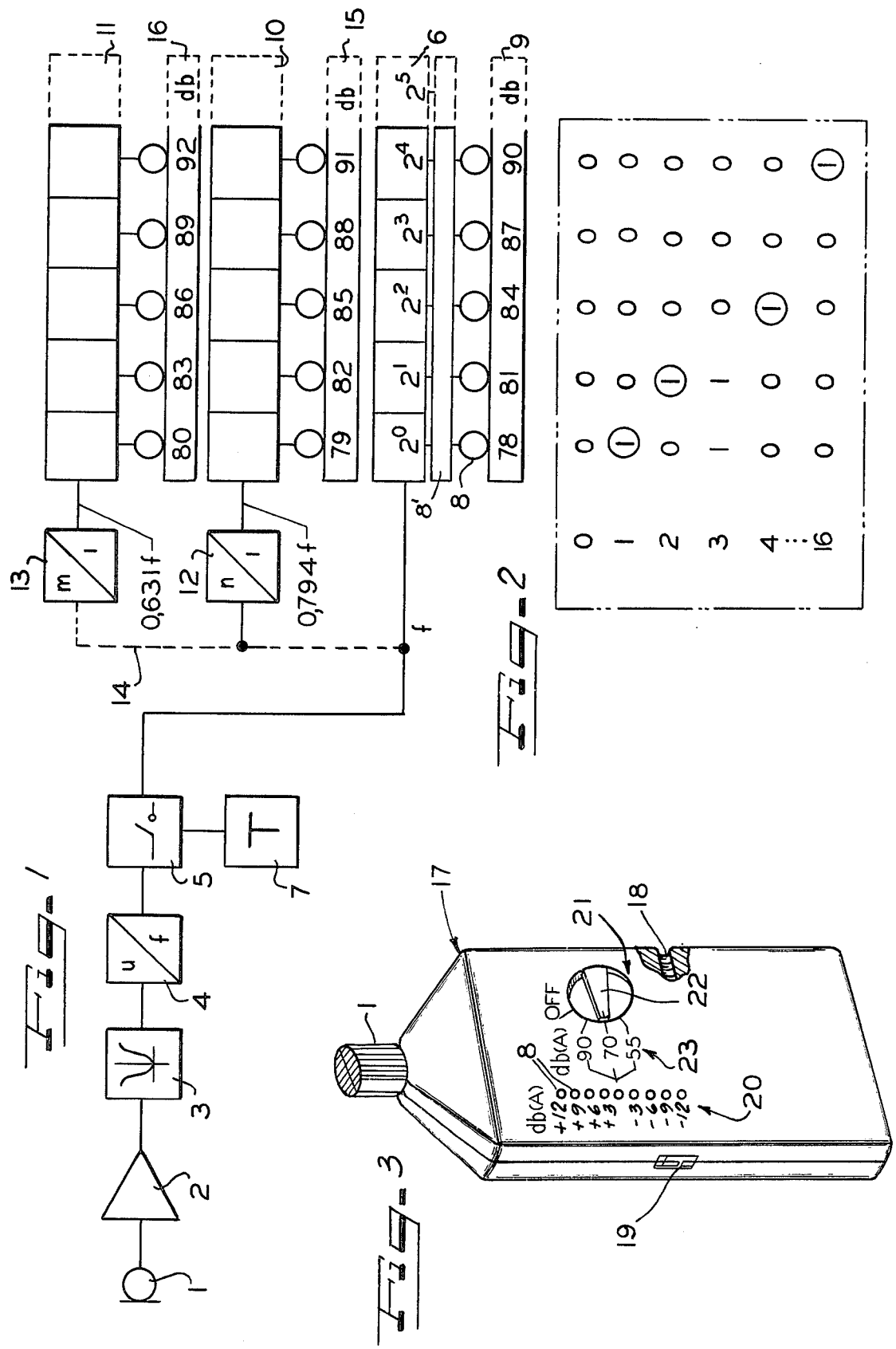

SOUND LEVEL METER

BACKGROUND OF THE INVENTION

1. Field of the Invention

The present invention relates to a sound level meter in which the output voltage of the microphone is supplied to a voltage-frequency converter by way of an exponential circuit, and more particularly to such a sound level meter in which the output of the voltage-frequency converter controls a binary counter having an indicator unit associated therewith and reading directly on a dB scale.

2. Description of the Prior Art

Integrating sound level meters of the type generally described above are known in the art. For example, one may refer to the publication "News From Rohde & Schwarz," Volume 68, Pages 9–12, which is published in English by Rohde & Schwarz, 8000 Muenchen 80, Germany, and fully incorporated herein by this reference. In the sound level meter disclosed in this publication, a dose of noise is measured and indicated by way of a binary counter having a common decimal numerical indicator and, simultaneously, the respective measuring duration is measured and indicated by way of a further counter. For measurements in accordance with the German Industrial Standards (DIN), a squaring of the measured standardized sound level is required, and thus a squarer is usually provided as an exponentially operating circuit in prior device. In accordance with the United States OSHA standard, an exponentially operating circuit with a factor of 1.2 is required, and the exponentially operating circuit is dimensioned correspondingly differently for such mesurements. When a squaring circuit is utilized, the noise dose value corresponds directly to the square of the measured sound pressure, which is integrated during the measuring duration, and the energy equivalent continuous sound level can be determined by dividing the sound dose value with the measured and indicated measuring duration and, by way of subsequent logarithmic application, in accordance with the prior art formula. These prior integrating sound level meters can be very universally applied due to the simultaneous indication of the respective measuring duration, but they have a drawback in that the evaluation of the result is very difficult. In order to simplify the evaluation-computation process, special computing discs have become known in the art, at which only the sound dose and the measuring duration is adjusted, and the energy equivalent continuous sound level can be read off directly. It is also known in the art to associate such an integrating sound level meter with a micro-computer which automates the computation process, as reported by Neumann in the article Noise-Measuring Practice, in the publication "Contact and Studies" Volume 4, Pages 117–120, published by Kruppke and Wippler, Center for Continuing Education, Academy Esslingen, Encyclopedia Publishing House, Grafenaul/Wurtt, Germany. Briefly, Neumann describes the prior art solution as being very technically detailed and expensive.

SUMMARY OF THE INVENTION

It is the object of the invention to provide a sound level meter which can be very simply and inexpensively assembled from standard electronic components and which still permits the direct indication of the respective measured sound level in dB without additional calculation operations.

This object is achieved, according to the present invention, in a sound level meter of the type generally mentioned above, wherein the output voltage of a microphone is supplied to a voltage-frequency converter by way of an exponentially operating circuit, and the output of the voltage-frequency converter controls a binary counter having an associated indicator unit. More specifically, a gate circuit, controlled by a timing generator, is connected between the voltage-frequency converter and the binary counter, the indicator elements are connected at the outputs of the successive counter stages and associated with individual increments of a dB scale.

A sound level meter constructed in accordance with the present invention permits the direct indication of the averaged sound level received by the microphone, in dB, upon a linear dB scale which is associated, for example, with indicator elements of the counter arranged in a row, without requiring any calculation operation by the user of the device, since the number of pulses supplied to the counter corresponds directly to the quotient of the noise dose/measuring duration due to the fixedly adjusted measuring duration which is determined by the timing generator. The continuous sound level, in dB, can therefore be directly indicated by way of the dB scale associated with the counter, the scale having subdivisions which depend upon the type of counter used and the type of measuring procedure. In the case of a binary counter, a doubling of the counter content corresponds to a shift of the indicator over one counter position.

If the German Industrial Standard (DIN) measuring method is used, with a squaring circuit as the exponential member, a doubling of the frequency of the voltage-frequency converter corresponds to an increase of the microphone sound level of 3 dB and therefore a dB scale with a 3 dB subdivision will result in the case of a sound level meter constructed in accordance with this invention and which comprises a squaring circuit and a subsequently connected binary counter, wherby to each 3 dB mark of the scale there is associated an individual indicator element of the binary counter.

BRIEF DESCRIPTION OF THE DRAWING

Other objects, features and advantages of the invention, its organization, construction and operation will be best understood from the following detailed description taken in conjunction with the accompanying drawing, on which:

FIG. 1 is a schematic circuit diagram of an integrated sound level meter constructed in accordance with the invention;

FIG. 2 is a truth table for illustrating indicator energization at various count states of a counter; and FIG. 3 is a perspective view of a sound level meter as it may be housed for use, for example, on a tripod mount (not shown).

DESCRIPTION OF THE PREFERRED EMBODIMENTS

Referring to FIG. 1, an integrated sound level meter is schematically illustrated as comprising a microphone 1, an amplifier 2, an exponentially operating circuit 3, a voltage-frequency converter 4, a gate 5, and a binary counter 6, all connected in tandem, and a timing circuit 7 connected to the gate 5 for controlling the open time of the gate.

The output voltage of the microphone 1, which corresponds to a certain standardized sound pressure level, is, in a manner well known in the prior art, supplied by way of the amplifier 2 having a predetermined frequency weighting to the exponentially operating circuit 3 which has the voltage-frequency converter connected to its output.

The exponentially operating circuit 3 may possibly have a prior art circuit for time weighting connected to its output, for example a peak-value rectifier having a predetermined drop-out time constant. In the case of a sound level measurement in accordance with IEC or DIN standards, a squaring circuit is used as the exponentially responding circuit which supplies an output voltage corresponding to the square of the input voltage. In the case of sound level measurements in accordance with the United States OSHA standards, an exponentially responding circuit having a power of 1.2 with effective value meter connected before are provided since, in accordance with this standard, a doubling of the noise dose per measuring time is prescribed only after 5 dB. In principle, the invention can be used with all of these prior art measuring principles; only the dB scale of the subsequently connected counters must be correspondingly adapted and incremented. In the following, however, the invention will be described exclusively in connection with the application of a squaring circuit 3, since this is the preferred embodiment of the sound level meter of the invention.

The output voltage of the squaring circuit 3, which corresponds to the square of its input voltage is supplied to the voltage-frequency converter 4, and the output frequency of the converter 4 is supplied to the counter 6, by way of a gate 5. The gate 5 is controlled by way of a timing generator 7, which is preset to a predetermined measuring time. When the device is switched on, or when a corresponding measuring key is depressed, the timing generator 7 opens the gate 5 for a predetermined measuring time T, and the measuring frequency of the converter 4 is applied to the counter 6 during this interval. After the expiration of the measuring interval T, the gate 5 is closed again and thus no pulses can reach the counter 6. In the exemplary embodiment illustrated on the drawing, a simple five stage binary counter is employed as the counter 6 which, depending on the required measuring range, can have several stages, as desired. Each individual stage of the counter 6 is associated with a special indicator element 8; in the most simple case, these indicator elements are luminous diodes which are directly connected with the output of the corresponding counter stage.

Due to the use of the squaring circuit 3, a doubling of the measuring frequency of the converter 4 corresponds to an increase of the sound level of 3 dB, which is provided at the microphone. A doubling of the measuring frequency and therefore also the doubling of the number of pulses supplied to the counter, however, also entails a shift of the counter content of the binary counter 6 by one stage upwards to the right, i.e. the indication at the indicator element 8, which are positioned in one row, shifts by one position toward the right, in the case of a doubling. This becomes particularly clear due to the common binary writing mode which is associated with the counter 6 and which is illustrated in the Truth Table of FIG. 2, in which the individual columns of the Truth Table are aligned with the associated indicators 8 and the 3 dB indicia borne on a dB scale 9. When, at first, the first stage $2^0$ is effective, and the associated first luminous diode 8 lights up, and, subsequently, the input sound level is increased by 3 dB, and thus the measuring frequency doubles, proceeding from this value will provide that the second counter stage $2^1$ has become effective and its indicator element 8 lights. When this value is again doubled, the third counter stage $2^2$ becomes effective and its associated luminous diode 8 lights, etc. The result is that the luminous diode which is associated with the highest activated counter stage directly indicates the respective sound level measuring value, directly in dB, namely due to the aforementioned squaring with a subdivision or incrementation of 3 dB, again as schematically illustrated by the dB scale 9 which is assigned to the luminous diodes 8. Because the measuring interval T is known, the scale 9 can be correspondingly calibrated in true dB-values.

For a simplified evaluation of the measured result, it is advantageous to assign a logic circuit to the counter 6, or to the outputs of this counter, extending to the individual luminous diodes 8, respectively, so that only the luminous diode of the respectively highest effective counter stage is illuminated and that the power-position and higher-position diodes remain dark. This is indicated at 8' in FIG. 1 showing a known so called priority-encoder-element schematically.

The timing generator 7 may be of a construction which is well known in the art; preferably, it consists of a simple counter which is triggered by a generator and which automatically closes the gate 5, after the input of a certain number of pulses. It is preferably adjustable, so that, depending upon the measuring task, measuring intervals between a few milliseconds and up to a few hours can be adjusted. However, in order to be able to maintain the calibration of the scale 9, it is required to arrange a correspondingly adjustable frequency divider or frequency multiplier between the converter 4 and the counter 6 so that, for example in the case of a doubling of the measuring interval T, the frequency is correspondingly divided or multiplied. This corresponding consideration of the adjustment of the measuring interval may, of course, also be effected directly in the voltage-frequency converter 4.

This adjustability of the timing generator 7 furthermore permits instantaneous value measurements with the help of this sound level meter, in such a way that the measuring interval is simply selected very short, for example in the order of magnitude of a few milliseconds, and, in addition, it is provided by way of the timing generator 7 that the counter 6 is reset before the renewed opening of the gate 5 and thus the execution of the next instantaneous value measurement. A simple linkage between the timing generator 7, the gate 5 and the counter 6, as well as an additional switch which permits the switching from integrating measurement to instantaneous measurement suffices for this purpose.

A finer dB incrementation may be obtained in accordance with a further development of the invention, in such a manner that two or several binary counters are used for the indication, and the indicator scales of these binary counters are correspondingly mutually staggered. In FIG. 1, an exemplary embodiment has been illustrated of this type of finer incrementation. In addition to the counter 6, two further, identically designed, binary counters 10 and 11 are provided, whose individual counter stages are again associated with respective indicator elements 8. A pair of frequency dividers 12 and 13 are connected between the output of the gate 5 and the input of the first stage of the respective counters 10 and 11. The division factors $n$ and $m$ of the frequency dividers 12 and 13 are tuned with respect to one another in such a way that the counter 10 indicates a 3 dB incrementation, respectively, in the sense of the associated dB scale 15, but with values shifted by 1 dB with respect to the dB scale 9. In the same manner, the counter 11 indicates a 3 dB incrementation in respect of its associated dB scale 16, with a 1 dB shift with respect to the dB scale 15 and a 2 dB shift with respect to the dB scale 9. When the two frequency dividers 12 and 13 are triggered directly from the output of the gate 5, together with the counter 6, via the broken line 14, then the division factor of the frequency divider is selected, for example, at 1.259, and the division factor of the divider 13 is selected at, for example, 1.585, and the desired mutual shifting of the dB scale 9, 15 and 16 is thus automatically obtained. Advantageously, in this mode of operation, the individual dB scales 9, 15 and 16 are subscales of the overall dB scale and are not arranged separately, as has been illustrated for purpose of simplicity and clarity in this exemplary embodiment, but are rather combined to form a single linear scale having a 1 dB incrementation, and the individual indicator elements 8 of the three counters 6, 10 and 11 are arranged, alinged with one another in a single row along the single linear dB scale. In this arrangement, for example, the indicator element 8 associated with the first stage of the counter 6 would appear first, then the indicator element associated with the first stage of the counter 10, then the indicator element associated with the first stage of the counter 11, and then the indicator element associated with the second stage of the counter 6, and so on through the indicator element associated with the last stage of the counter 11. For a simple realization of the desired uneven division factors, the divider 12 (and 13) may, for example, be supplied with the output frequency of the converter 4, by way of a common frequency multiplier of, for example, 1000; a frequency divider 1:1000 is then connected ahead of the counter 6 and the desired uneven division ratios $n$ and $m$ of the frequency dividers 12 and 13 can then be selected for example, by 1259 and 1585. Such dividers may be realized very simply and inexpensively with well known electronic components.

A 1 dB incrementation of the scale 9 might also be obtained, for example, in such a way that the squared output voltage of the squarer 3 is supplied to a further cubing circuit, so that a doubling of the measuring frequency corresponds to an increase of the level by 1 dB. Such an analog solution is, however, more technically detailed than the above-mentioned digital solution.

As illustrated in FIG. 3, the sound level meter may be provided with a housing 17 which is adapted at 18, for example by means of a threaded bore, for mounting such as would be provided by a tripod or the like. The microphone 1 is attached at the top of the housing and the circuits, in this particular illustration, are connected for battery operation, the battery control and checking indicator being illustrated at 19.

A dB scale with a 3 dB incrementation is illustrated at 20 with the luminous diodes 8 associated therewith. Associated with the dB scale 20 are a switch 21, for controlling the amplification of amplifier 2, having a manually operable actuating member 22 and a range indicia 23 whereby different sound level ranges may be selected. The range indicia 23 indicates the reference level for instance 55, 70 or 90 dB to which or from which the 3 dB stepped values of scale 20 have to be added or subtracted. For example if switch 21 is switched to indicia 70 dB as shown in FIG. 3 and the third indicator element 8 from above corresponding to the +6 dB mark of scale 20 lights, the true integrated sound level of 76 dB is indicated. Of course a combined scale with 1 dB incrementation as discussed above with respect to a composite of the scales 9, 15 and 16 could be provided.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A sound level meter, comprising:
signal receiving means for receiving and converting sound level into a corresponding electrical signal;
exponentiating means connected to said signal receiving means to raise the values of the electrical signal to a higher power;
converting means for converting the electrical voltage amplitude of the electrical signals of the exponentiating means into a corresponding frequency;
multistage binary counting means for counting pulses applied thereto;
a plurality of individual indicators connected to respective stages of the counter;
a dB scale associated with said indicators;
gating means connected between said converting means and said binary counting means; and
timing means controlling said gating means and operable to open said gating means for a predetermined interval.

2. The sound level meter of claim 1, wherein:
said exponentiating means comprises a squarer; and
said dB scale includes 3 dB imcrementation indicia marks with an indicator associated with each 3 dB mark.

3. The second level meter of claim 1, wherein:
said exponentiating means creates a raising of power by 1.2; and
said dB scale includes 5 dB incrementation indicia marks with an indicator associated with each 5 dB mark.

4. The sound level meter of claim 1, wherein:
said counting means comprises a plurality of multistage binary counters with a plurality of indicators connected to respective counter stages;
said dB scale is composed of a plurality of subscales mutually staggered and intertwined to a single scale;
each of said subscale is associated to the indicators of each of said counters; and
frequency divider means are connected at least between some of said counters and said gating means.

5. The sound level meter of claim 1, comprising:
a logic circuit connected between said counter stages and said indicators to that only the indicator associated with the highest operated counter stage is energized.

6. The sound level meter of claim 1, wherein:
said indicators comprise luminous diodes.

7. The sound level meter of claim 1, comprising:
an adjustable timing generator for providing different predetermined open times for said gating means; and
a frequency divider or multiplier connected between said voltage-frequency converter means and said binary counter.

8. The sound level meter of claim 1, wherein:
said signal receiving means comprises a microphone for transducing sound level into corresponding electrical signals.

9. The sound level meter of claim 1, comprising:
a housing, and a microphone attached to said housing and connected to said signal receiving means, and wherein said signal receiving means, said exponentiating means, said converting means, said counting means, said gating means and said timing means are mounted in said housing; and wherein said dB scale is borne on the exterior of said housing and said indicators are mounted in a row adjacent said dB scale.

10. A sound level meter, comprising:
a microphone for transducing sound into corresponding electrical signals;
a voltage-frequency converter for changing electrical voltage amplitude into a frequency,
amplification and exponentiating means connected between said microphone and said voltage-frequency converter to amplify and provide an exponential change in the electrical signals;
a binary counter for counting the frequency of signals applied thereto, said counter including a plurality of stages;
a plurality of indicators connected to respective counter stages;
a dB scale associated with said indicators so that the count of said counter may be read directly in dB;
a gate connected between said voltage frequency converter and said counter; and
a timing generator connected to said gate and operable to open said gate for a predetermined interval to operate said counter.

11. The sound level meter of claim 10, wherein:
said amplification and exponentiating means for providing an exponential change comprises a squarer; and
said dB scale includes a 3 dB incrementation indicia marks with an indicator associated with each 3 dB mark.

12. The sound level meter of claim 10, comprising:
a logic circuit connected between said counter stages and said indicators so that only the indicator associated with the highest operated counter stage is energized.

13. The sound level meter of claim 10, wherein:
said indicators comprise luminous diodes.

14. The sound level meter of claim 10, comprising:
a frequency changing circuit connected between said voltage-frequency converter and said counter, and wherein said timing generator is an adjustable timing generator for providing different predetermined open times for said gate.

15. A sound level meter, comprising:
sound transducer means for convering incident sound into a corresponding electrical signal;
a voltage-frequency converter for converting the voltage of the electrical signal into a corresponding frequency signal;
binary counting means, including a multi-stage counter, operable to count the oscillations of the frequency signal;
gating means operable for a predetermined interval to apply the frequency signal to said binary counting means;
a dB scale including spaced dB marks; and
a plurality of indicators, each of said indicators associated with a respective dB mark and connected to and energized by a respective counter stage.

16. A sound level meter comprising:
a dB scale bearing an indicia of spaced dB marks;
a plurality of luminous indicators, each of said indicators mounted adjacent a respective dB mark and energizable to provide a direct dB reading:
signal receiving means for receiving and converting an audio signal into a signal having a frequency corresponding to the magnitude of the audio signal;
counting means for receiving the corresponding frequency signal, including a plurality of counter stages connected to said indicators and
gating means operable for a predetermined interval for connecting said signal receiving means to said counting means.

17. The sound level meter of claim 16, wherein:
said signal receiving means comprises
a microphone, and
signal squaring means connected to said microphone.

18. The sound level meter of claim 17, wherein:
said dB scale is divided into a plurality of subscales all of which are intertwined as a composite single scale;
said counting means comprises a plurality of multi-stage counters, one for each subscale; and
said signal receiving means comprises, for at least each subscale in excess of one, a frequency changer connected between said signal squaring means and respective ones of said multi-stage counters.

19. The sound level meter of claim 10, comprising:
a housing, said signal receiving means mounted in said housing and said microphone extending through said housing, and said counting means and said gating means mounted in said housing,
switch means carried by said housing and including a manually operably actuating element on the exterior of said housing, said switch means connected to select the amplification level of said amplification and exponentiating means;
said dB scale is borne on the exterior of said housing and said indicators are mounted adjacent said dB scale; and further comprising
range indicia on said housing extending between said dB scale and the operating positions of said actuating element.

* * * * *